United States Patent [19]
Mashikian et al.

[11] 3,770,877
[45] Nov. 6, 1973

[54] CAPACITIVELY GRADED ELECTRICAL INSULATING DEVICES

[75] Inventors: Matthew S. Mashikian, Huntington Woods, Mich.; James K. Kelley, Carleton, Mich.; William C. McMurray, Clair Shores, Mich.

[73] Assignee: The Detroit Edison Company, Detroit, Mich.

[22] Filed: Apr. 14, 1972

[21] Appl. No.: 243,975

Related U.S. Application Data

[63] Continuation-in-part of Ser. No. 86,709, Nov. 4, 1970, Pat. No. 3,673,305.

[52] U.S. Cl............ 174/143, 252/63.2, 252/63.5, 317/61, 317/247, 317/258, 317/261
[51] Int. Cl.... H01b 17/28, H01g 3/135, H01g 7/04
[58] Field of Search............ 174/19, 31 R, 73 R, 174/73 SC, 80, 137 B, 140 R, 140 S, 141 R, 142, 143; 317/61, 62, 63, 65, 67–72, 242, 247, 256, 258, 259, 260, 261; 252/63, 63.2, 63.5, 64

[56] References Cited
UNITED STATES PATENTS

| 1,334,140 | 3/1920 | Dubilier | 317/261 |
|---|---|---|---|
| 1,937,010 | 11/1933 | Dubilier et al. | 317/242 |
| 3,512,874 | 6/1950 | Reynolds | 317/258 X |
| 2,593,829 | 4/1952 | Arledter et al. | 317/260 X |
| 2,619,443 | 11/1952 | Robinson | 317/258 X |
| 3,126,439 | 3/1964 | Denholm et al. | 174/142 X |
| 3,194,782 | 7/1965 | Devaney et al. | 317/258 X |
| 3,257,501 | 6/1966 | Sauer | 174/143 |
| 3,479,443 | 11/1969 | Mashikian et al. | 174/73 R |
| 3,511,922 | 5/1970 | Fisch et al. | 174/137 B |
| 3,673,305 | 6/1972 | Mashikian et al. | 174/143 X |

FOREIGN PATENTS OR APPLICATIONS

| 157,450 | 7/1954 | Australia | 317/258 |
|---|---|---|---|
| 596,543 | 8/1925 | France | 317/261 |
| 297,462 | 4/1917 | Germany | 174/142 |
| 424,896 | 9/1947 | Italy | 174/140 R |

*Primary Examiner*—Laramie E. Askin
*Attorney*—Donald P. Bush

[57] ABSTRACT

Capacitively graded electrical insulating devices, preferably modular, designed as insulators, bushings, and lightning arrestors. Plates are assembled with linear spacing and with specially compounded dielectric material of epoxy resin containing a high percentage of ferroelectric powder interposed between plates, with plates electrically connected to increase capacitance.

43 Claims, 8 Drawing Figures

United States Patent [19]
Mashikian et al.
[11] 3,770,877
[45] Nov. 6, 1973
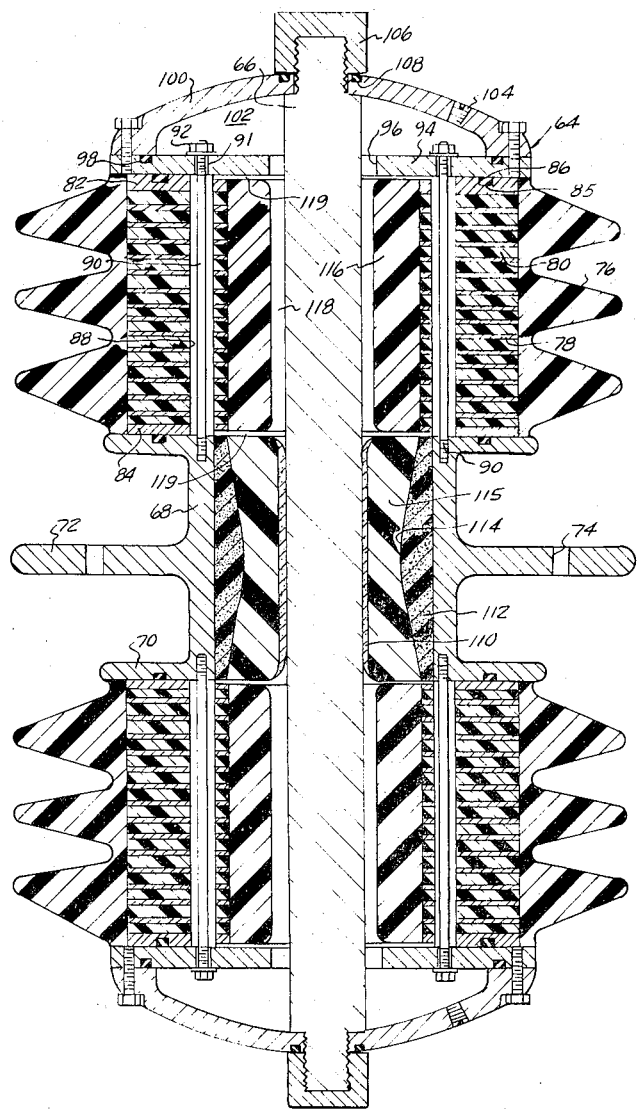

CAPACITIVELY GRADED ELECTRICAL INSULATING DEVICES

RELATED CASES

The present invention is an improvement over our prior U.S. Pat. No. 3,479,443, and is a Continuation-in-Part of our prior application Ser. No. 86,709 filed Nov. 4, 1970, now U.S. Pat. No. 3,673,305.

BRIEF SUMMARY OF THE INVENTION

This invention relates to capacitively graded electrical insulating devices, in which a very high voltage electric field existing between spaced points, one of which is usually at ground potential, is controlled and its gradient rendered more uniform.

Specific designs are disclosed for use as post (compression) insulators, suspension (tension) insulators, bushings, and lightning arrestors, including arrangements for providing modular constructions.

The capacitive grading is accomplished by a linear assembly of flat metal rings or discs, which are separated by but in contact with discs of dielectric material, composed essentially of a suitable resin and a high percentage of ferro-electric powder having useful dielectric properties, specifically a temperature responsive variation. Best results are obtained when the powder s mainly barium titanate, and epoxy resin is entirely suitable as the resin.

A further improvement of the present invention is the electrical interconnection of alternate discs or rings in specific patterns to provide a great increase in capacitance without a corresponding increase in physical dimensions.

DETAILED DESCRIPTION

Figure 1:
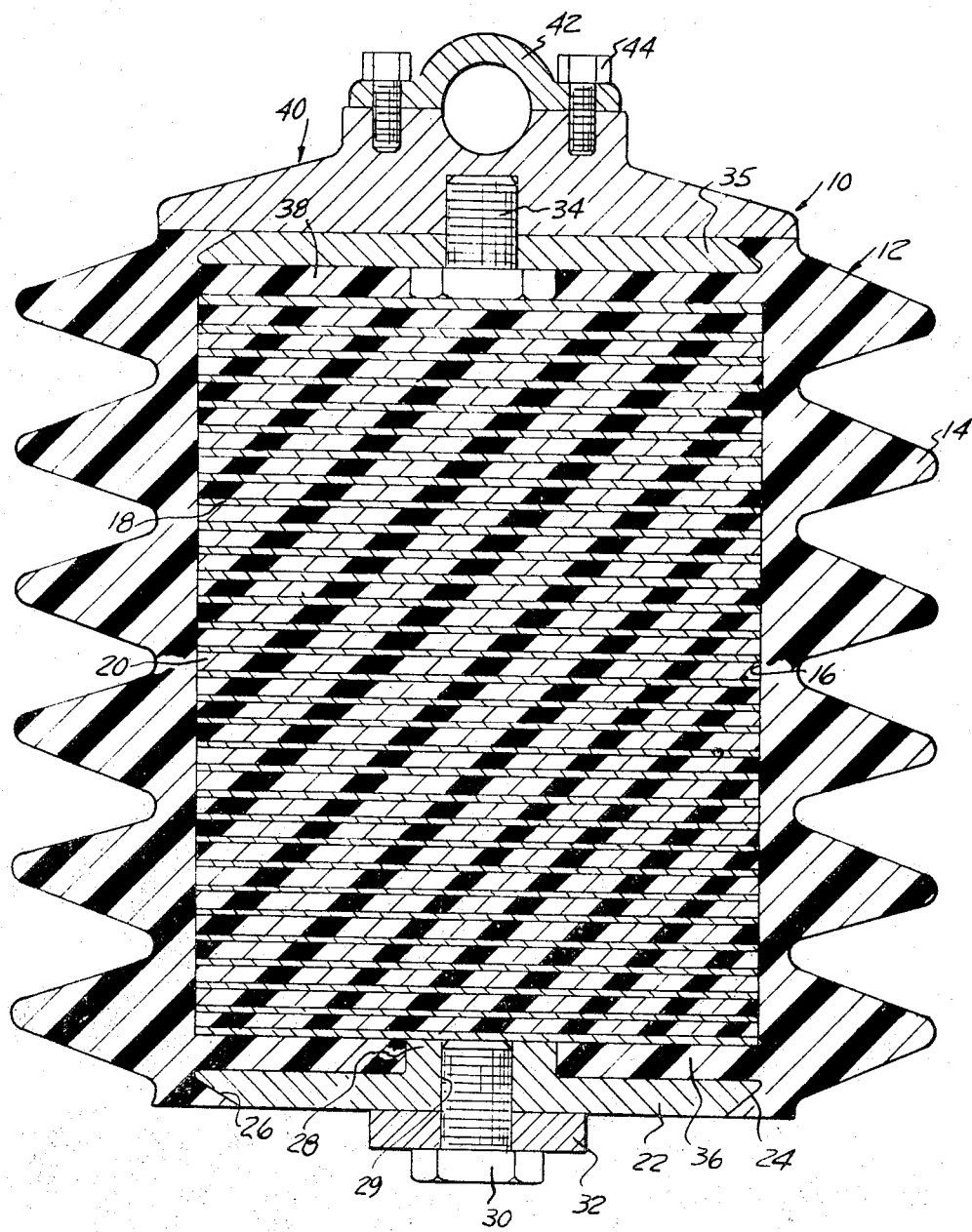
FIG. 1 is a longitudinal sectional view of a capacitively graded post type insulator of modular construction.

Referring first to FIG. 1, there is shown a post type capacitively graded insulator, capable of use in a modular assembly. The insulator indicated generally at 10 comprises an insulating shell or casing 12 having radially outwardly extending annular ribs 14 and provided at its interior with an elongated cylindrical cavity 16. The shell 12 is formed of a hard track and arc resistant material. Within the cavity 16 is a multiplicity of series connected capacitances constituted by alternated metal discs 18 and discs 20 formed of dielectric material, the nature and properties of which will be disclosed subsequently.

At the lower end of the insulator is a metal mounting or connecting plate 22, the peripheral edge of which is tapered as shown at 24 and received in the correspondingly shaped annular recess 26 formed in the shell or casing 12. Plate 22 has a tubular extension 28 having an aperture extending through the plate and being internally threaded as seen at 29 to receive a mounting bolt 30 which attaches the insulator to a mounting arm or bracket 32.

The construction at the upper end is similar to the lower end, except that a threaded stud 34 is provided extending through an opening in end plate 35, which extends axially beyond the end of the insulating shell or casing 12.

The construction so far described is made by causing the dielectric material of the discs 20 to flow into the spaces between metal discs, and by casting the material of the insulating shell or casing 12 in place. It will be noted that the upper plate 35 and the lower plate 22 are spaced from the metal discs 18 at the ends of the assembly of capacitances formed by discs 18 and 20, but that electrical contact with the end discs 18 is made by flange 28 to the lower most disc 18, and by headed stud 34 with the uppermost disc.

The insulating material of the shell or casing 12 extends in a thin ring 36 into the space between the lowermost metal disc 18 and the lower plate 22, thus providing a solid integral structure. Similarly, at the upper end, the insulating material extends in a thin ring 38 to surround and embed the head of stud 34.

In FIG. 1 there is illustrated a conductor clamp body 40, including a removable cap 42 secured to the body 40 by screws 44. The conductor clamp has a threaded opening to receive stud 34, and with the arrangement illustrated the upper disc 18 of the array of capacitances is at line potential, while the lowermost disc 18 is at ground potential with mounting bracket 32.

It will be apparent from inspection that the module terminating with end plates 22 and 35 may be assembled in end to end relation by screwing the stud 34 of one into threaded aperture 29, in which case the adjacent end discs 18 of the two modules are electrically connected together, and the number of capacitances in series is doubled. With this construction, the ends of insulating shells or casings 12 are in tight contact and the entire assembly of capacitances is completely enclosed.

Figure 2:
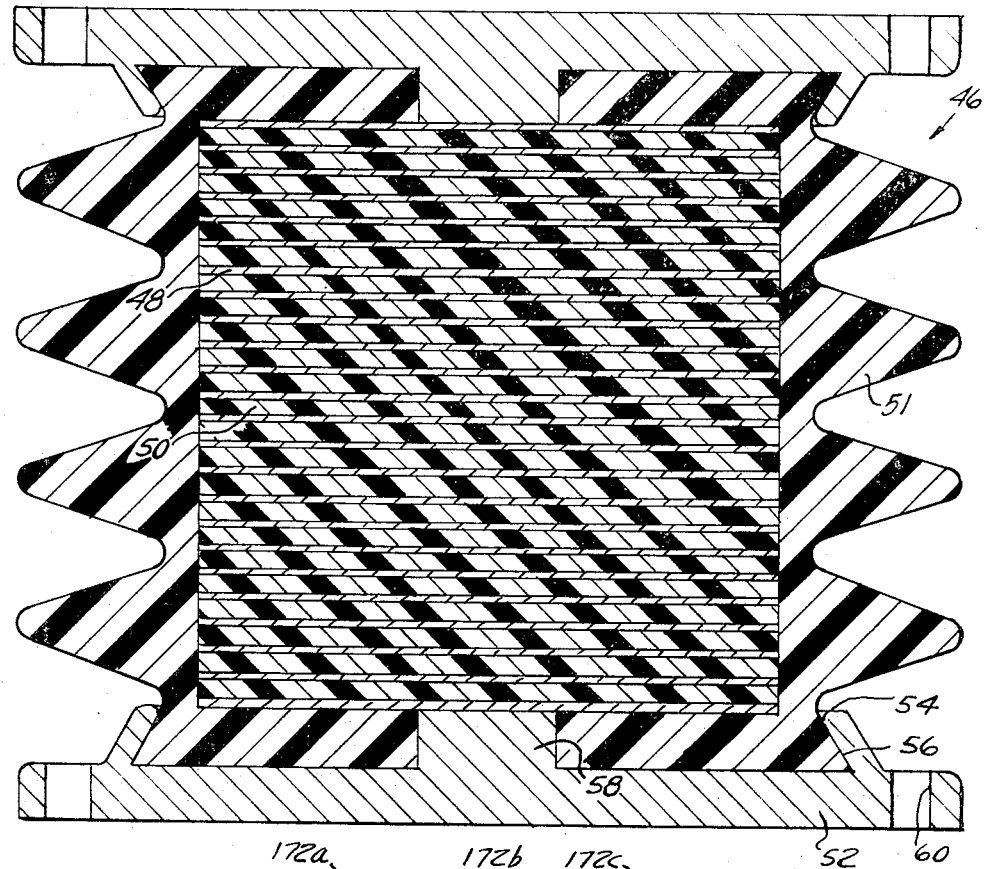
FIG. 2 is a longitudinal sectional view of an insulator of different construction.

Referring now to FIG. 2 there is illustrated a somewhat different embodiment of the invention. The device shown here at 46 is also a post type insulator, and comprises the assembly of series connected capacitances made up of alternate metal discs 48 and discs 50 of dielectric material of the same character as discs 20 seen in FIG. 1, and disposed within an insulating shell 51.

In this construction identical end mounting or connecting plates 52 are provided, each plate having an annular inwardly inclined flange 54 into which an outwardly inclined lip 56 on the insulating shell or body 51 extends. The connection is made by casting the material of the shell around the assembly of discs 48 and 50, and provides a solid strong assembly of parts. Each end plate 52 has a central projection 58 which is in firm, electrical contact with the adjacent end metal disc 48.

The plates 52 are provided with matching openings 60, so that a series of modules 46 may be mechanically and electrically connected by bolts passing through the openings and clamping the plates together. The lowermost plate may be mounted on a flat bracket provided with openings matching openings 60, and a conductor clamp generally similar to that shown at 40 in FIG. 1 may be bolted to the upper plate.

Figure 3:
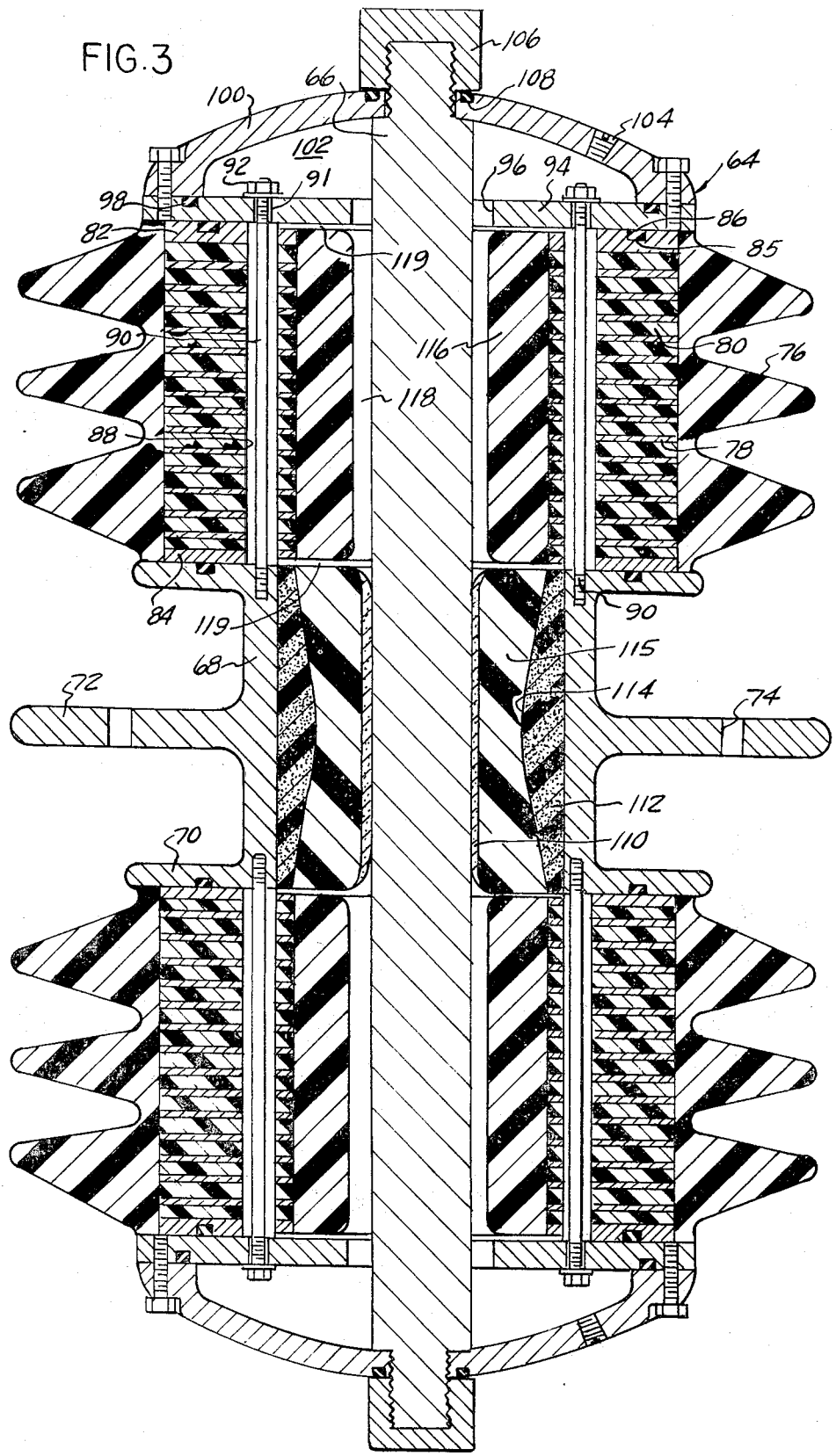
FIG. 3 is a longitudinal sectional view of a capacitively graded insulating bushing.

Referring now to FIG. 3 there is illustrated an insulating bushing 64 for passing a high voltage conductor 66 through wall structure comprising a tubular housing 68 having end flanges 70 and a central mounting flange 72 apertured as indicated at 74 for attachment to the wall of a grounded housing.

Opposite ends of the insulating device 64 are identical and only the upper end structure will be described in detail.

The insulating shell 76 is cast around an assembly of end engaged metal rings 78 and rings 80 formed of dielectric material. End rings 82 and 84 are thicker than intermediate metal rings 78, and ring 82 has an annular groove 85 to receive a sealing O-ring 86. The discs are also provided with matching openings defining through passages 88 which receive elongated assembly rods or bolts 90 formed of insulating material having threaded metallic sleeves 91 firmly fixed to the ends thereof. It will be seen that in the assembly, the metallic parts are outside the region where an electric field exists (i.e., either embedded in the grounded base or surrounded by the end caps which are at elevated voltage). The inner ends of rods 90 are threaded into openings at the adjacent end of housing 68 and the outer ends receive nuts 92 which may be metal. The outer ends of rods 90 pass through openings in plates 94 apertured as seen at 96 to receive conductor 66. Plates 94 also have annular grooves 98 for the reception of sealing O-rings which seal against the annular surface of end caps 100. Caps 100 are domed to define an oil chamber 102, and are provided with removable sealing oil plugs 104. The ends of the conductor 66 are threaded to receive connectors 106, an oil seal being provided as indicated at 108.

Within the tubular housing 68 there are provided semiconducting shields 110 and 112 which may be of a suitable dielectric material containing sufficient carbon, graphite or other conducting particles to provide suitably low conductivity. The outer shield has its inner surface 114 shaped to the convex configuration shown, in axial section. Intermediate shields 110 and 112 insulating material is provided in tubular form as seen at 115, conforming to the specially shaped surface 114. Generally tubular insulation is provided at 116, and may be of the dielectric material of which rings 80 are formed. Insulation 116 is provided in spaced relation to conductor 66, leaving an annular oil chamber 118 in communication with chamber 102, and with enlarged passages 88 surrounding bolts 90 through radial channels 119 formed in end rings 84.

Figure 4:
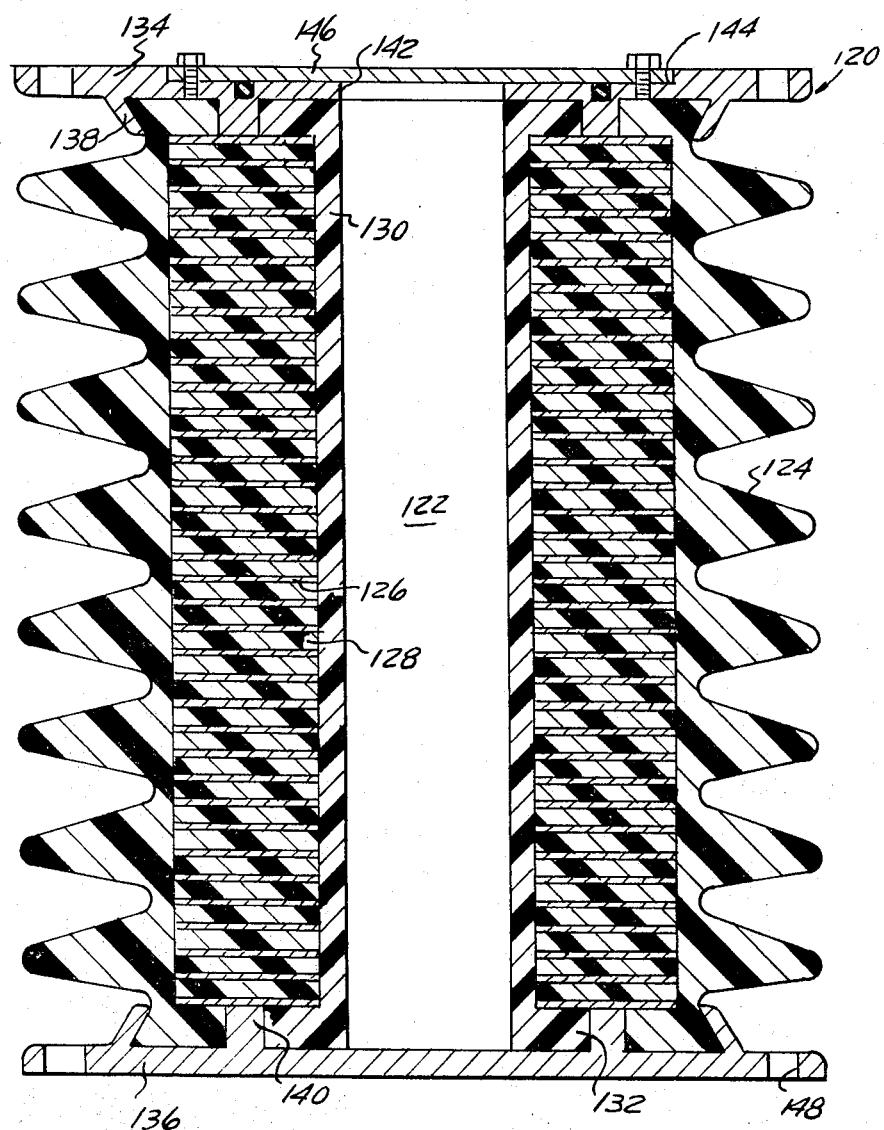
FIG. 4 is a longitudinal sectional view of a capacitively graded lightning arrestor.

Referring now to FIG. 4 there is illustrated an insulating device 120 intended for housing lightning arrestor components. For this purpose, the device 120 has a central opening 122 for receiving the spark gaps and resistors in an atmosphere of nitrogen or dry air. The illustrated construction comprises a single module, but two or more may be combined as required.

Within the insulating shell 124 there is a multiplicity of series connected capacitances made up of rings 126 of metal and rings 128 of a suitable dielectric material. Within the assembly of rings 126 and 128, is a tubular insulating body 130 having end flanges 132. End plates 134 and 136 each have inwardly inclined flanges 138 interfitting with similarly shaped portions at the ends of shell 124. Both plates 134 and 136 also have axially extending flanges 140 which abut the outer surfaces of flanges 132. One end plate, here the plate 134, has a central opening 142 and a recessed seat 144 which receives a removable cover plate 146 affording access to the space 122 within the device.

Plates 134 and 136 are provided with matching openings 148, by means of which the housing assemblies may b bolted together, if desired, and suitably mounted on a similarly formed mounting bracket and connected to the line to be protected by the lightning arrestor.

In the foregoing mention was made of the fact that the dielectric material between the metal plates or rings in the series connected capacitances was specially selected to give improved results in operation.

More particularly, this dielectric material is an epoxy resin, and epoxy resins specially selected for the purpose are described below.

Epoxy resins are chemcially characterized by the fact that their molecules contain at least one epoxy group:

This characteristic group may be incorporated into molecules in various positions. Those epoxy resins which have been found to have the most desirable properties for the purposes of the present invention are the cycloaliphatic epoxy resins wherein the epoxy group is attached onto a saturated cyclic structure and the cycloaliphatic glycidyl epoxy resins wherein the epoxy group is situated on a linear chain which is attached to a saturated cyclic structure.

Some examples of the cycloaliphatic epoxy resins are given below:

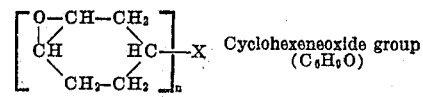

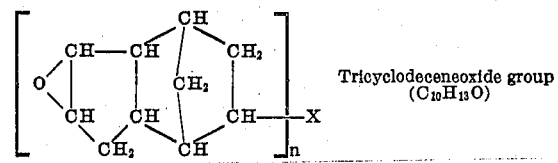

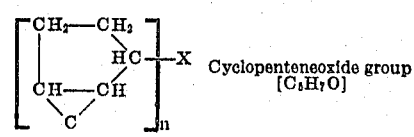

where x = ester, ether, acetal, imide, amide, hydrocarbon radicals.

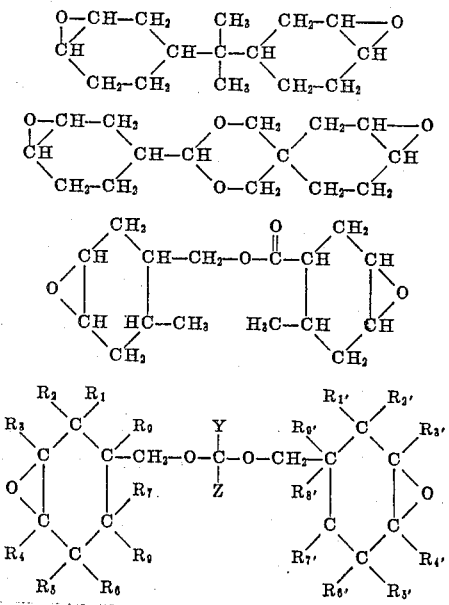

in which R, $R_1$, $R_1'$, $R_2$, $R_2'$, $R_3$, $R_3'$, $R_4$, $R_4'$, $R_5$, $R_5'$, $R_6$, $R_6'$, $R_7$, $R_7'$, $R_8$, $R_8'$, $R_9$ and $R_9'$ taken individually represent monovalent substituents, such as halogen atoms, alkoxy groups, or aliphatic, cycloaliphatic, araliphatic or aromatic hydrocarbon radicals, (e.g. lower alkyl radicals i.e. alkyl radicals of one to four carbon atoms), or represent hydrogen atoms, and $R_1$ and $R_5$ taken together or $R_1'$ and $R_5'$ taken together represent a divalent substituent, such as a methylene group, and Z and Y represent hydrogen atoms or monovalent organic radicals, such as aliphatic, cycloaliphatic, araliphatic, aromatic or heterocyclic radicals or one of Z and Y represents a direct bond or a divalent grouping linking the structure shown to the median carbon atom contained in a repetition of said structure.

It is also possible, for the purposes of the present invention, to use cycloaliphatic epoxy resins which have the epoxy group attached to both the saturated cyclic structure and to the linear chain structure. Some examples of these mixed resins are given below:

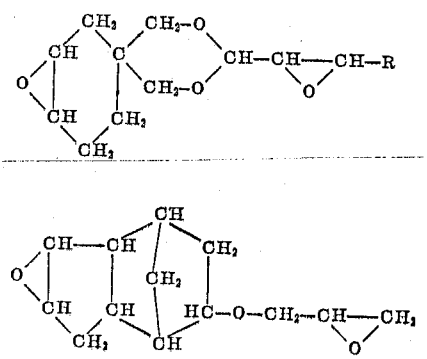

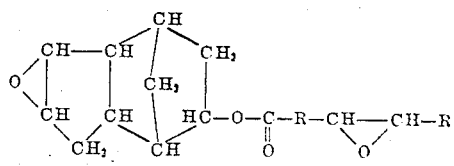

Examples of the cycloaliphatic glycidyl epoxy resins are the cycloaliphatic digylcidyl ester resins, one example of which is the diglycidyl ester of hexadrophthalic acid.

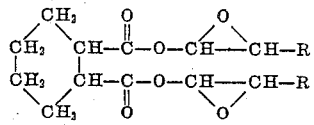

The cyclohexene oxide and cycloaliphatic diglycidyl ester resins were preferred for use in the structure disclosed herein.

These cycloaliphatic and glycidyl cycloaliphatic resins may be cured by the usual epoxy resin curing agents such as amines, amides, organic acids, and acid anhydrides. It has been found, however, that the acid anhydride curing agents give the best results. An example of an acid anhydride curing agent which is of particular value is hexahydrophthalic anhydride.

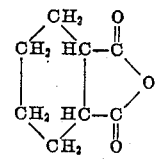

The formation of the filled resin is completed by the addition of powdered ferroelectric material which has the property of increasing the dielectric strength of the compound and which, in accordance with the preferred form of the present invention, includes ferroelectric materials selected to produce a compound whose dielectric constant increases with temperature. More particularly, the material is compounded so as to have a non-linear relationship between dielectric constant and voltage applied, such that the increase in charging current resulting from an increase in voltage applied is greater than would be the case if a linear relationship existed.

In general terms, the ferroelectric powders are selectd from the group consisting of barium titanate, strontium titanate, calcium titanate, magnesium titanate, lead titanate, and calcium zirconate. Of these, the barium titanate is markedly superior and while the actual powders may include a mixture of several different compounds, best results are obtained when barium titanate exceeds 50 percent by weight and preferably, amounts to at least 60 percent by weight of the ferroelectric material.

A specific example of the resin compound which has been found to give the best results is as follows:

| Material | Parts by Weight |
|---|---|
| EPOXY RESIN: | |
| Diglycidyl ester of hexa-hydrophthalic acid | 100 |
| CURING AGENT: | |
| Hexahydrophthalic anhydride | 78 |
| FERROELECTRIC POWDERS: | |
| Barium titanate 80% by weight) | |
| Calcium zirconate 10% by weight) | 500 |
| Strontium titanate 9% by weight) | |

It will be observed that in the above identified specific example, the percentages by weight of the components are as follows:

| Resin | 14.75% |
|---|---|
| Curing Agent | 11.50 |
| Ferroelectric Powder | 73.75 |

Thus, it will be seen that the cured resin, exclusive of the powdered ferroelectric filler constitutes 26.25 percent, and the ferro-electric powder constitutes 73.75 percent.

In more general terms, the powdered ferroelectric material will constitute approximately 75 percent by weight of the composition, the remaining 25 percent being the cured resin made up of the resin and curing agent. The powdered ferroelectric material will in any case constitute the major portion by weight of the filled resin and, preferably, wil amount to between 65-85 percent.

Referring now to FIGS. 5-8 there is illustrated, more or less diagrammatically, an arrangement in which the metal plates or discs, alternated with the dielectric material as illustrated for example in FIG. 1, are electrically connected in particular patterns to provide greatly increased overall capacitance without increasing the size of the device.

Figures 5, 6, 8:
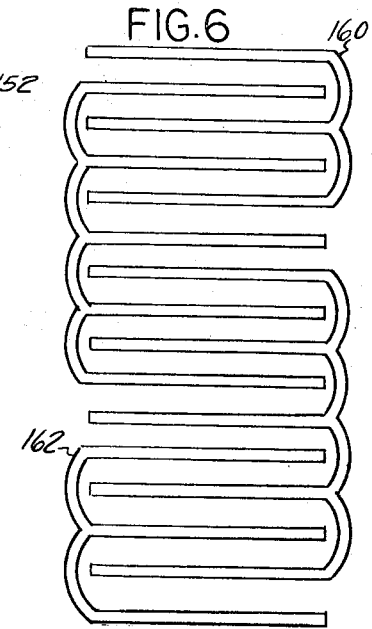
FIG. 5 is a diagrammatic view of a special arrangement and interconnection of capacitance plates.
FIG. 6 is a view similar to FIG. 5, showing a different arrangment of plates.
FIG. 8 is a diagrammatic view showing capacitively graded structure employing bent stampings of the type shown in FIG. 5.

In FIG. 5 there are shown thirteen plates which are divided into two end pairs of plates 150a and 150b electrically connected as indicated at 152. Three intermediate groups of three plates each are provided, the plates of the upper of these groups being designated 154a, the plates of the middle group being designated 154b, and the plates of the lower group being designated 154c. It will be noted that upper plate 154a is interleaved between plates 150a. Center plate 154a is interleaved between the lower plate 150a and the upper plate 154b of the middle group. Lower plate 154a is interleaved between the two upper plates 154b of the middle group. Upper plate 154c of the lower intermediate group is interleaved between the two lower plates 154b of the middle group. Center plate 154c is interleaved between the lower plate 154b of the middle group and upper plate 150b of the lower end pair. Lower plate 154c is interleaved between the plates 150b of the lower pair.

It is to be observed that if two modules comprising plates interconnected as seen in FIG. 5 are joined with metal plates at one end thereof in contact, a symmetrical array of plates is produced in which the two pairs of plates at the end combine to form a single group of three plates, the two plates in contact constituting a single plate in function. Thus, the two modules together form an array of seven intermediate groups of three plates.

In FIG. 6 there is illustrated an arrangement in which sixteen plates are interconnected to form end groups 160 and 162 of three plates each, symmetrically interleaved as shown with two intermediate groups of five plates each. Again, two such modules, if end plates are engaged, provides five intermediate groups of five plates each.

There is a numerical relationship between the number of groups, the number of plates in each group and the total number of plates. A represents the number of plates in an intermediate grouping, and A must be an odd integer such as 1, 3, 5, 7, etc. B represents the number of intermediate groupings and N represents the total number of plates. Then, $$N = A(B+1) + 1. \qquad (a)$$

Applying this to the arrangement of FIG. 5:

$$13 = 3(3+1) + 1.$$

The number of plates in each end grouping is:

½ (A+1) or, in FIG. 5, two plates.

Applying formula (a) to an arrangement resulting from joining two modules as shown in FIG. 5:

$$25 = 3(7+1) + 1,$$

which is correct because the two end plates 150a and 150b in contact in function become a single plate.

Applying the formula (a) to the arrangement seen in FIG. 6:

$$16 = 5(2+1) + 1.$$

The advantage of connecting the plates in groups in this fashion is the increased total capacitance of a given module. A higher modular capacitance results in improved voltage distribution. For example, if the total number of plates in each intermediate group (A) is one, and the total number of plates (N) is forty, the total capacitance of the stack is $$C/(N-1) = C/39$$

where C is the capacitance between two consecutive plates.

If the 40 plates are connected as seen in FIG. 5, where the number of plates in each intermediate group (A) is three, the total capacitance is $$(A^2 \times C)/(N-1) = 9C/39$$

This of course represents a capacitance nine times that where the same number of plates are not connected into groups.

Figure 7:
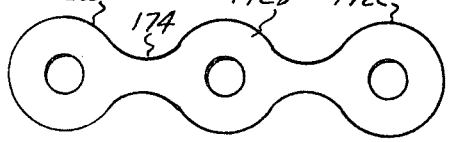
FIG. 7 is an elevational view of a metal stamping suitable for use in making capacitively graded structure of the type shown in FIG. 5.

In FIG. 7 there is shown a metal stamping which may be thin guage aluminum which may be bent into the configuration of the intermediate groups 170 of three plates each seen in FIG. 8. It will be seen that plates 172a, 172b, and 172c are interconnected by thin straps 174, and these elements are identified in FIG. 8. End groups 176 of two plates each are formed from a similar stamping.

What we claim as our invention is:

1. A capacitively graded electrically insulating device comprising a series of alternated flat metal and dielectric elements in side abutment, in which the dielectric material is a cured cycloaliphatic epoxy resin containing a powdered ferroelectric material in an amount exceeding 50 percent by weight of the dielectric material.

2. A device as defined in claim 1 in which the ferroelectric material is between 65-85 percent by weight of the dielectric material.

3. A device as defined in claim 2 in which the resin is one which includes a carboxylic cyclic structure in the molecule.

4. A device as defined in claim 2 in which the resin is a cyclohexene oxide resin.

5. A device as defined in claim 2 in which the resin is glycidyl cycloaliphatic resin.

6. A device as defined in claim 2 in which the resin is a cycloaliphatic diglycidyl ester resin.

7. A device as defined in claim 2 in which the resin is diglycidyl ester of hexahydrophthalic acid.

8. A device as defined in claim 2 in which the powdered ferroelectric material is selected from or constitutes a mixture of two or more members of the group consisting of barium titanate, strontium titanate, calcium titanate, magnesium titanate, lead titanate, and calcium zirconate.

9. A device as defined in claim 8 in which the powdered ferroelectric material includes at least 50 percent by weight of barium titanate.

10. A device as defined in claim 9 in which the barium titanate exceeds 60 percent by weight of the ferroelectric powder.

11. A device as defined in claim 9 in which the barium titanate constitutes about 80 percent by weight of the ferroelectric powder.

12. A device as defined in claim 1 in which the ferroelectric material is about 75 percent by weight of th dielectric material.

13. A device as defined in claim 1 in which the resin is one which includes a carboxylic cyclic structure in the molecule.

14. A device as defined in claim 1 in which the resin is a cyclohexene oxide resin.

15. A device as defined in claim 1 in which the resin is glycidyl cycloaliphatic resin.

16. A device as defined in claim 1 in which the resin is a cycloaliphatic diglycidyl ester resin.

17. A device as defined in claim 1 in which the resin is diglycidyl ester of hexahydrophthalic acid.

18. A device as defined in claim 1 in which the powdered ferroelectric material is selected from or constitutes a mixture of two or more members of the group consisting of barium titanate, strontium titanate, calcium titanate, magnesium titanate, lead titanate, and calcium zirconate.

19. A device as defined in claim 18 in which the powdered ferroelectric material includes at least 50 percent barium titanate by weight of the ferroelectric powder.

20. A device as defined in claim 19 in which the barium titanate exceeds 60 percent by weight of the ferroelectric powder.

21. A device as defined in claim 19 in which the barium titanate constitutes about 80 percent by weight of the ferroelectric powder.

22. A capacitively graded electrical insulating device comprising an elongated series of alternated flat metal and dielectric plates in side abutment, in which the metal plates are divided into longitudinally overlapping groups and the plates of each group are electrically connected together, in which the groups of plates comprise end groups and intermediate groups and each intermediate group includes plates interleaved between plates of each adjacent group, in wich the intermediate groups comprise an odd number of plates, in which the number of plates in the end groups is equal to ½ (N+1) where N is the number of plates in each intermediate group, in which each device comprises a module in which a metal plate electrically connected to the end plate of the adjacent end group is exposed at each end thereof, means for interconnecting a pair of like modules with end plates in contact, thereby combining the adjacent end groups of metal plates into a composite intermediate group having the same number of metal plates as the intermediate groups of each module.

23. A capacitively graded electrical insulating device comprising an elongated series of alternated flat metal and dielectric plates in side abutment, in which the metal plates are divided into longitudinally overlapping groups and the plates of each group are electrically connected together, in which the groups of plates comprise end groups and intermediate groups and each intermediate group includes plates interleaved between plates of each adjacent group, in which the metal plates of each group are in the form of a stamping of metal sheet material having enlarged plate portions and narrow connector portions bent to position the plate portions in spaced parallel relation.

24. A capacitively graded electrical insulating device comprising an outer tubular insulating body formed of an insulating resin, the ends of said body having radially inwardly extending flanges having central openings therethrough, the interior of said body intermediate said flanges being a cavity of cylindrical configuration, a series of flat, circular, alternated metal and dielectric plates assembled in side abutment filling said cavity, metal mounting and connector plates at each end of said body having a projection extending through the opening in the flange of said insulating body into contact with the metal plate at the adjacent end of the series of plates within said cavity.

25. An insulating device as defined in claim 24 in which said mounting and connector plates have flat surfaces exposed at the ends of said device for engagement in electrically conducting relation with like surfaces at the ends of like devices.

26. An insulating device as defined in claim 24 in which one of said mounting and connector plates has a threaded stud extending outwardly therefrom, and the other of said mounting and connector plates has a threaded opening designed to accept the threaded element identical with the stud at the other end thereof.

27. An insulating device as defined in claim 24 in which said plates are all in the form of complete circular discs, and in which said device constitutes an insulating support for an intermediate portion of a high voltage electric conductor.

28. An insulating device as defined in claim 24 in which said plates are annular, leaving a central opening in the assembled plates.

29. An insulating device as defined in claim 24 in which said end mounting and connector plates have continuous inwardly converging flanges at their inner side, said tubular insulating body having outwardly tapered continuous flanges at its ends filling the space between the inner surfaces of said inwardly converging flanges and the adjacent portion of said mounting and connector plates to provide a solid permanent interconnection thereof.

30. A capacitively graded insulating bushing for passing a high voltage conductor through an opening in a grounded wall comprising an elongated conductor, a tubular metal body surrounding said conductor and having a radial flange intermediate its ends for connection to the wall, said body having an opening therethrough substantially larger than said conductor so as to leave an annular space between its inner surface and the conductor, insulating shield structure filling said space comprising an outer shield element formed of semi-conducting material having an inner longitudinally convex surface and an inner element having its outer surface longitudinally concave and in surface contact with the inner surface of said outer element, the concave and convex surfaces being substantially symmetrical with respect to the plane of said flange, and like capacitively graded insulating structure secured to opposite ends of said metal body.

31. A bushing as defined in claim 30 in which each of said capacitively graded insulating structures comprises a series of flat annular alternated metal and dielectric rings abutted in side contact with each other, and an outer tubular insulating shell having a central opening in which said rings are received with their outer edges in contact with the inner surface of the central opening in said insulating shell.

32. A bushing as defined in claim 31 in which the end rings of said series are metal rings, and in which the metal rings at the inner ends of said series are in surface contact with the end surface of siad tubular metal body.

33. A bushing as defined in claim 32 in which the opneing in said rings is dimensioned to provide an annular space with the conductor passing therethrough, insulating material extending in contact over the inner surface of said series of rings and leaving an annular space with the conductor, and an oil chamber secured to the outer end of said outer tubular shell in communication with the annular space between the insulating material within said series of rings and the conductor extending therethrough.

34. A capacitively graded insulating bushing for passing a high voltage conductor through an opening in a grounded wall comprising an elongated conductor, a tubular metal body surrounding said conductor and having a radial flange intermediate its ends for connection to the wall, said body having an opening therethrough substantially larger than said conductor so as to leave an annular space between its inner surface and the conductor, insulating material filling the space in said tubular metal body between its inner surface and the conductor therein, an outer tubular insulator shell at each end of said metal body, a series of flat alternated metal and dielectric rings within each of said insulator shells, and means electrically connecting the conductor to the metal rings at the remote ends of said series, and means electrically connecting said tubular metal body to the metal rings at the adjacent ends of said series.

35. A capacitively graded electrical insulating device in module form comprising an elongated series of alternated flat metal and dielectric plates in side abutment, in which the metal plates are divided into longitudinally overlapping groups and the plates of each group are electrically connected together, in which the groups of plates comprise end groups and intermediate groups and each intermediate group includes plates interleaved between plates of each adjacent group, in which said device comprises a metal plate electrically connected to the end plate of each of the adjacent end groups and exposed at each end thereof, means for interconnecting a pair of like modules with end plates in contact for combining the adjacent end groups of metal plates into a composite intermediate group having the same number of metal plates as the intermediate groups of each module.

36. A capacitively graded electrical insulating device in module form capable of mechanical and electrical connection to like devices comprising a generally tubular insulating shell, a multiplicity of thin imperforate plates in face to face relation within said shell, said plates being of altered metal and dielectric material, end plates closing at least that portion of said shell which receives said thin plates and electrically connected to the thin metal plates adjacent thereto, and means on said end plates for mechanically and electrically connecting end plates of a plurality of said devices.

37. A device as defined in claim 36 in which said plates are complete circular plates.

38. A device as defined in claim 36 in which said plates are annular.

39. A device as defined in claim 36 in which said shell is cast around said thin plates.

40. A device as defined in claim 39 in which said shell is cast into interlocking engagement with said end plates.

41. A device as defined in claim 40 in which the said end plates are exposed at the ends of said shell, and the means for mechanically and electrically connecting end plates of a plurality of devices comprises clamping means for clamping end plates of interconnected devices together.

42. A device as defined in claim 41 in which said clamping means comprises a threaded stud projecting axially of each device from one end plate of each device, and a threaded recess in the other end plate of such device arranged to receive the threaded stud of a like device.

43. A device as defined in claim 41 in which said clamping means comprises similarly placed openings in both end plates to receive clamping devices such as nuts and bolts.

* * * * *